(12) United States Patent
Moshchuk et al.

(10) Patent No.: US 7,672,765 B2
(45) Date of Patent: Mar. 2, 2010

(54) ENHANCED ROLL STABILITY INDICATOR FOR VEHICLE ROLLOVER CONTROL

(75) Inventors: Nikolai K. Moshchuk, Grosse Pointe, MI (US); Shih-Ken Chen, Troy, MI (US); Flavio Nardi, Farmington Hills, MI (US)

(73) Assignee: GM Global Technnology Operations, Inc., Detroit, MI (US)

( * ) Notice: Subject to any disclaimer, the term of this patent is extended or adjusted under 35 U.S.C. 154(b) by 523 days.

(21) Appl. No.: 11/685,833

(22) Filed: Mar. 14, 2007

(65) Prior Publication Data

US 2007/0162204 A1 Jul. 12, 2007

Related U.S. Application Data

(63) Continuation-in-part of application No. 11/330,640, filed on Jan. 12, 2006.

(51) Int. Cl.
*B60G 17/16* (2006.01)
(52) U.S. Cl. .......................... 701/38; 701/69; 180/197; 180/199; 280/5.5
(58) Field of Classification Search .................. 701/38, 701/69; 180/197, 199; 280/5.5; 104/284
See application file for complete search history.

(56) References Cited

U.S. PATENT DOCUMENTS

| | | | | |
|---|---|---|---|---|
| 5,265,020 A | * | 11/1993 | Nakayama | 701/36 |
| 5,475,593 A | * | 12/1995 | Townend | 701/38 |
| 5,742,918 A | * | 4/1998 | Ashrafi et al. | 701/70 |
| 6,002,974 A | * | 12/1999 | Schiffmann | 701/36 |
| 6,002,975 A | * | 12/1999 | Schiffmann et al. | 701/36 |
| 6,169,946 B1 | * | 1/2001 | Griessbach | 701/45 |
| 6,192,305 B1 | * | 2/2001 | Schiffmann | 701/45 |
| 6,290,019 B1 | * | 9/2001 | Kolassa et al. | 180/282 |
| 6,292,759 B1 | * | 9/2001 | Schiffmann | 702/151 |
| 6,332,104 B1 | * | 12/2001 | Brown et al. | 701/1 |

(Continued)

FOREIGN PATENT DOCUMENTS

DE 10350046 A1 * 5/2005

(Continued)

OTHER PUBLICATIONS

Robust Model-Based Fault Detection for a Roll Stability Control System; Li Xu; Tseng, H.E.; Control Systems Technology, IEEE Transactions on; vol. 15, Issue 3, May 2007 pp. 519-528; Digital Object Identifier 10.1109/TCST.2006.890287.*

(Continued)

*Primary Examiner*—Cuong H Nguyen

(57) ABSTRACT

A system and method for providing a vehicle roll stability indicator that dynamically estimates the probability for vehicle rollover. The system determines vehicle kinematics from various vehicle sensors. From these kinematic values, the system estimates a roll angle of the vehicle and a bank angle of the vehicle. The estimated bank angle is used to correct the roll angle. The system determines a roll energy of the vehicle and a roll energy rate of the vehicle from the corrected roll angle. The system also calculates a tire lateral load transfer of the relative forces on the vehicle tires, and the duration that any of the tires have been off of the ground. From the roll energy, the roll energy rate, the tire lateral load transfer and the wheel airborne duration, the system calculates the roll stability indicator.

26 Claims, 3 Drawing Sheets

U.S. PATENT DOCUMENTS

| | | | |
|---|---|---|---|
| 6,338,012 B2 * | 1/2002 | Brown et al. | 701/1 |
| 6,449,542 B1 * | 9/2002 | Bottiger et al. | 701/41 |
| 6,593,849 B2 * | 7/2003 | Chubb et al. | 340/446 |
| 6,971,726 B2 * | 12/2005 | Levy et al. | 303/150 |
| 7,240,630 B2 * | 7/2007 | Akers | 114/122 |
| 2001/0056317 A1 * | 12/2001 | Nishizaki et al. | 701/48 |
| 2004/0024514 A1 * | 2/2004 | Levy et al. | 701/82 |
| 2005/0076726 A1 * | 4/2005 | Akers | 74/5.47 |
| 2008/0082246 A1 * | 4/2008 | Brown et al. | 701/91 |
| 2008/0086251 A1 * | 4/2008 | Lu et al. | 701/70 |

FOREIGN PATENT DOCUMENTS

| | | | |
|---|---|---|---|
| DE | 102005045378 A1 * | 3/2007 | |
| DE | 102007001714 A1 * | 8/2007 | |
| EP | 1110835 A2 * | 6/2001 | |
| EP | 1110835 B1 * | 11/2005 | |
| EP | 2013043 A1 * | 1/2009 | |
| JP | 01168596 A * | 7/1989 | |
| JP | 04232113 A * | 8/1992 | |
| JP | 09109641 A * | 4/1997 | |
| JP | 2001219840 A * | 8/2001 | |
| RU | 2218222 C2 * | 12/2003 | |
| WO | WO 2007125227 A1 * | 11/2007 | |

OTHER PUBLICATIONS

Development and Experimental Evaluation of a Slip Angle Estimator for Vehicle Stability Control; Piyabongkarn, D.; Rajamani, R.; Grogg, J.A.; Lew, J.Y.; Control Systems Technology, IEEE Transactions on; vol. 17, Issue 1, Jan. 2009 pp. 78-88 Digital Object Identifier 10.1109/TCST.2008.922503.*

Robust observer for prevention of vehicle rollover; Rabhi, A.; Chadli, M.; El Hajjaji, A.; Bosche, J.; Advances in Computational Tools for Engineering Applications, 2009. ACTEA '09. International Conference on; Jul. 15-17, 2009 pp. 627-632 Digital Object Identifier 10.1109/ACTEA.2009.5227837.*

Unified Chassis Control for Rollover Prevention and Lateral Stability; Jangyeol Yoon; Wanki Cho; Bongyeong Koo; Kyongsu Yi; Vehicular Technology, IEEE Transactions on; vol. 58, Issue 2, Feb. 2009 pp. 596-609 Digital Object Identifier 10.1109/TVT.2008. 927724.*

Rollover risk prediction of an instrumented heavy vehicle using high order sliding mode observer; Imine, H.; Benallegue, A.; Madani, T.; Srairi, S.; Robotics and Automation, 2009. ICRA '09. IEEE International Conference on; May 12-17, 2009 pp. 64-69 ; Digital Object Identifier 10.1109/ROBOT.2009.5152185.*

New method of identifying real-time Predictive Lateral load Transfer Ratio for rollover prevention systems; Tsourapas, V.; Piyabongkarn, D.; Williams, A.C.; Rajamani, R.; American Control Conference, 2009. ACC '09.; Jun. 10-12, 2009 pp. 439-444; Digital Object Identifier 10.1109/ACC.2009.5160061.*

Research on Rollover Early Warning Algorithm for Heavy Tractor-Semitrailer Based on PTR Metric; Zhu Tianjun; Zong Changfu; Intelligent Systems and Applications, 2009. ISA 2009. International Workshop on; May 23-24, 2009 pp. 1-4 Digital Object Identifier 10.1109/IWISA.2009.5073081.*

Active Roll Control of Heavy Tractor-Semitrailer Based on Adaptive Gain Scheduling Control; Tianjun Zhu; Hongyan Zheng; Computing, Communication, Control, and Management, 2008. CCCM '08. ISECS International Colloquium on; vol. 2, Aug. 3-4, 2008 pp. 131-134; Digital Object Identifier 10.1109/CCCM.2008.123.*

Design of a Novel Fuzzy Controller to Enhance Stability of Vehicles; Biglarbegian, M.; Melek, W.; Golnaraghi, F.; North American Fuzzy Information Processing Society, 2007. NAFIPS '07. Annual Meeting of the, Jun. 24-27, 2007 pp. 410-414 Digital Object Identifier 10.1109/NAFIPS.2007.383874.*

Vehicle State Estimation for Roll Control System; Jihan Ryu; Moshchuk, N.K.; Shih-Ken Chen; American Control Conference, 2007. ACC '07; Jul. 9-13, 2007 pp. 1618-1623; Digital Object Identifier 10.1109/ACC.2007.4282456.*

Simulation study of oscillatory vehicle roll behavior during fishhook Maneuvers; Moshchuk, N.; Mousseau, C.; Norman, K.; American Control Conference, 2008, Jun. 11-13, 2008 pp. 3933-3940; Digital Object Identifier 10.1109/ACC.2008.4587107.*

Investigation of ION and a Heavy Truck on Rollover Propensity and Prevention; Yongjie Zhu; Ozguner, I.; American Control Conference, 2007. ACC '07; Jul. 9-13, 2007 pp. 1630-1635; Digital Object Identifier 10.1109/ACC.2007.4283126.*

\* cited by examiner

ENHANCED ROLL STABILITY INDICATOR FOR VEHICLE ROLLOVER CONTROL

CROSS-REFERENCE TO RELATED APPLICATIONS

This application is a continuation-in-part application of U.S. patent application Ser. No. 11/330,640, titled "Roll Stability Indicator for Vehicle Rollover Control," filed Jan. 12, 2006.

BACKGROUND OF THE INVENTION

1. Field of the Invention

This invention relates generally to a system and method for providing a vehicle roll stability indicator that is indicative of the potential for vehicle rollover and, more particularly, to a system and method for providing a vehicle roll stability indicator that is indicative of the potential for vehicle rollover, where determining the roll stability indicator includes calculating vehicle roll energy, roll energy rate, tire lateral load transfer and wheel airborne duration.

2. Discussion of the Related Art

It is known in the art to provide vehicle control enhancement using differential braking control, rear-wheel steering control, front-wheel steering control, or any combination thereof to help prevent a vehicle from encountering conditions that present an increased possibility of rollover. These systems may receive vehicle dynamics information from various sensors, such as yaw rate sensors, lateral acceleration sensors and tire/wheel sensors to determine the proper control action. These systems may also incorporate roll-rate sensors and roll angle estimation features in order to estimate rollover possibility during a maneuver and provide responsive control enhancement. A balance typically needs to be provided between controlling the vehicle roll motion and the vehicle yaw motion to provide the optimal vehicle response. Thus, it is usually necessary to detect certain vehicle conditions to provide the optimized vehicle control enhancement.

Various methodologies are known in the art to detect these vehicle conditions. Rollover determination can be based on vehicle roll rate from a roll rate sensor and roll angle estimation. Even though roll rate and roll angle are the two most important elements for detecting vehicle roll motion, they do not reflect the total vehicle roll energy that would eventually determine the probability of rollover.

SUMMARY OF THE INVENTION

In accordance with the teachings of the present invention, a system and method are disclosed for providing a vehicle roll stability indicator that estimates the probability for vehicle rollover. The system determines vehicle kinematics from various vehicle sensors, such as roll rate, yaw rate, lateral acceleration, vehicle speed, tire/wheel force, etc. From these kinematic values, the system estimates a roll angle of the vehicle and a bank angle of the vehicle. The estimated bank angle is used to correct the roll angle. The system determines a roll energy of the vehicle and a roll energy rate of the vehicle from the corrected roll angle. The system also determines a tire lateral load transfer of the relative forces on the vehicle tires, and the duration that any of the tires have been off of the ground. From the roll energy, the roll energy rate, the tire lateral load transfer and the wheel airborne duration, the system calculates the roll stability indicator that defines the potential that the vehicle may roll over. From the roll stability indicator, vehicle stability systems can take suitable action.

Additional features of the present invention will become apparent from the following description and appended claims taken in conjunction with the accompanying drawings.

DETAILED DESCRIPTION OF THE EMBODIMENTS

The following discussion of the embodiments of the invention directed to a process for estimating the probability of vehicle rollover by using the vehicles roll energy, roll energy rate, tire lateral load transfer and wheel airborne duration is merely exemplary in nature, and is in no way intended to limit the invention or its applications or uses.

As will be discussed below, the present invention includes a system and method for determining the probability that a vehicle wheels will lift off of the ground (tip-up) or the vehicle will rollover by determining a roll stability indicator (RSI) as a function of vehicle roll energy, roll energy rate, tire lateral load transfer and wheel airborne duration. Vehicle rollover involves a complex interaction of forces acting on the vehicle that are influenced by driver inputs, vehicle factors and road conditions.

Figure 1:
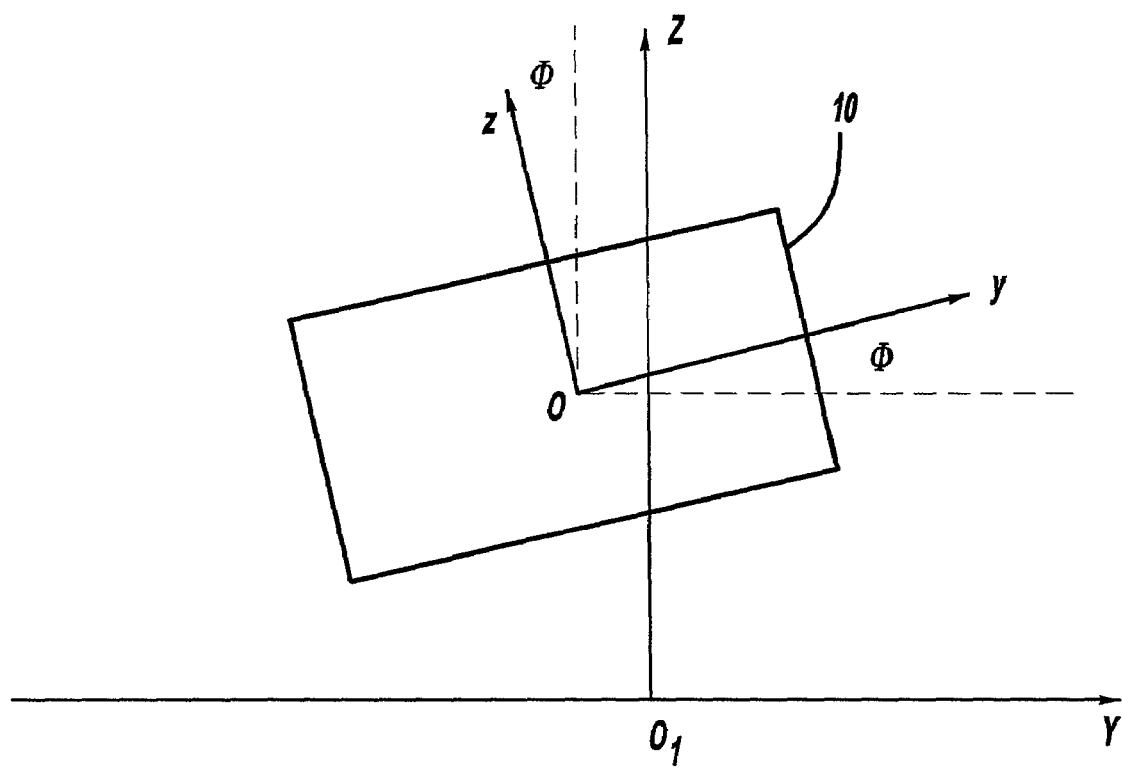
FIG. 1 is a schematic diagram of a vehicle under a roll motion.

FIG. 1 is a schematic diagram of a vehicle 10 in a rollover condition relative to an $O_1XYZ$ reference frame, where X is the forward direction relative to the vehicle 10, Z is the vertical direction relative to the vehicle 10 and Y is the lateral direction relative to the vehicle 10. It is assumed that the vehicle 10 is moving on a horizontal plane, and a vertical degree of freedom and the effect of tire overturning moment is neglected. A sprung mass fixed reference frame Oxyz of the vehicle 10 is shown in the roll position.

Under a steady-state condition during the roll, the center of gravity (CG) of the sprung mass of the vehicle 10 moves laterally and vertically and follows the trajectory:

$$Y = Y(\phi) \quad (1)$$

$$Z = Z(\phi) \quad (2)$$

Where $\phi$ is the vehicle roll angle.

The kinetic energy T and the potential energy $\Pi(\phi)$ of the vehicle sprung mass are given as:

$$T = \frac{1}{2}I_o\dot{\varphi}^2 + \frac{1}{2}M(Y'^2 + Z'^2)\dot{\varphi}^2 \quad (3)$$

$$\Pi(\varphi) = \Pi_{susp}(\varphi) + MgZ(\varphi) \quad (4)$$

Where $I_O$ is the roll moment of inertia of the sprung mass of the vehicle about the center of gravity, M is the mass of the vehicle, prime denotes differentiating with respect to the roll angle $\phi$, and $\Pi_{susp}(\phi)$ is the suspension potential energy during the roll motion.

In the linear region, $\Pi_{susp}(\phi)=K\phi^2$, where K is the roll stiffness. However, in the complete region, this is a non-linear function due to suspension ride and roll rate non-linearities.

If the mass of the vehicle 10 is rotated about a roll center, then:

$$M(Y'^2+Z'^2)=MH^2 \tag{5}$$

Where H is the vehicle sprung mass center of gravity height above the roll axis.

By letting $(a_Y,a_Z)$ and $(a_y,a_z)$ be the components of the vector of acceleration in the frames $O_1XYZ$ and Oxyz, respectively, then:

$$a_Y=a_y \cos\phi - a_z \sin\phi \tag{6}$$

$$a_Z=a_y \sin\phi + a_z \cos\phi \tag{7}$$

The measured lateral accelerations $a_{ym}=a_y+g \sin\phi$ and $a_{zm}=a_z+g \sin\phi$ include the effect of gravity. The expression for the generalized force is:

$$Q=-M(a_YY'+a_ZZ')-I_{xz}\dot{r} \tag{8}$$

Where $I_{xz}$ is the yaw-roll product of inertia and r is the yaw rate.

Equation (8) can be defined in the form:

$$Q=-M[a_{ym}(Y'\cos\phi+Z'\sin\phi)+a_{zm}(-Y'\sin\phi+Z'\cos\phi)-gZ']-I_{xz}\dot{r} \tag{9}$$

Lagrange's equation of motion is given as:

$$I_1\ddot{\phi}+\frac{1}{2}I_1'\dot{\phi}^2 = -\Pi'_{susp}-c\dot{\phi}-M\begin{bmatrix} a_{ym}(Y'\cos\varphi+Z'\sin\varphi)+ \\ a_{zm}(-Y'\sin\varphi+Z'\cos\varphi) \end{bmatrix} \tag{10}$$

Where $I_1=I_O+M(Y'^2+Z'^2)$.

Equation (10) is valid for different phases of roll motion, including prior to wheel lift, one wheel lifted, two wheels lifted, etc. Note that the behavior of the functions Y, Z, c, Π is different for these phases.

The energy of the vehicle system can then be defined as:

$$E = T+\Pi = \frac{1}{2}I_1(\varphi)\dot{\varphi}^2 + \Pi_{susp}(\varphi) + MgZ(\varphi) \tag{11}$$

The change of energy (roll rate) during the roll motion is the derivative of the roll energy E:

$$\dot{E}=\dot{\phi}Q \tag{12}$$

The present invention also uses a tire lateral load transfer (TLLT) value in the calculation of the roll stability indicator. When the vehicle 10 begins to lift on one side, the load or vertical force on the tires on that side will be reduced, and the load on the tires on the other side will increase. It is known in the art that these loads can be calculated or estimated using mathematical models, or can be measured using force sensors in the tires, wheel bearings, etc.

Tire lateral load transfer value $TLLT_{front}$ for the front tires and a tire lateral load transfer value $TLLT_{rear}$ for the rear tires can be calculated as:

$$TLLT_{front} = \frac{F_{LF}-F_{RF}}{F_{LF}+F_{RF}} \tag{13}$$

$$TLLT_{rear} = \frac{F_{LR}-F_{RR}}{F_{LR}+F_{RR}} \tag{14}$$

Where $F_{LF}$ is the vertical force on the left front tire, $F_{RF}$ is the vertical force on the right front tire, $F_{LR}$ is the vertical force on the left rear tire and $F_{RR}$ is the vertical force on the right rear tire. When the vehicle 10 has no roll components, then the TLLT value will be 0, and if two wheels of the vehicle 10 are off the ground, then both $TLLT_{front}$ and $TLLT_{rear}$ values will be one.

The duration $D_{airborne}$, that one or more of the wheels is lifted off the ground is also desirable for more accurately calculating the roll stability indicator. From the force measurements or calculations used to determine the TLLT value, the algorithm will know when a wheel is off the ground, i.e., airborne, and can then determine the duration that the wheel is airborne.

From equations (11), (12) and (14) and the airborne duration value $D_{airborne}$, the roll stability indicator (RSI) can be calculated as:

$$RSI = c_1 \frac{E}{E_{2WL}} + c_2 \frac{\dot{E}}{\dot{E}_{critical}} + c_3 TLLT_{front} + c_4 TLLT_{rear} + c_5 D_{airborne} \tag{15}$$

Were $E_{2WL}$ is the predetermined amount of energy needed to lift two vehicle wheels, $\dot{E}_{critical}$ is the predetermined critical amount of energy rate where the vehicle will roll over and $c_1$, $c_2$, $c_3$, $c_4$ and $c_5$ are speed-dependent constants. Both the energy $E_{2WL}$ and the critical energy rate $\dot{E}_{critical}$ can be determined experimentally by vehicle testing. For a typical SUV, $E_{2WL}$=1000 Nm and $\dot{E}_{critical}$=12500 Nm/sec. Table 1 below is an exemplary look-up table that can be used to provide the speed-dependent constants $c_1$, $c_2$, $c_3$, $c_4$ and $c_5$ for different vehicle speeds based on simulations.

TABLE 1

| | Speed (kph) | | | | |
|---|---|---|---|---|---|
| | 0 | 30 | 60 | 90 | 120 |
| $c_1$ | 0.8 | 0.9 | 1.0 | 1.1 | 1.2 |
| $c_2$ | 0.9 | 0.95 | 1.0 | 1.05 | 1.1 |
| $c_3$ | 0.1 | 0.11 | 0.12 | 0.13 | 0.14 |
| $c_4$ | 0.1 | 0.11 | 0.12 | 0.13 | 0.14 |
| $c_5$ | 0.3 | 0.32 | 0.34 | 0.36 | 0.38 |

Figure 2:
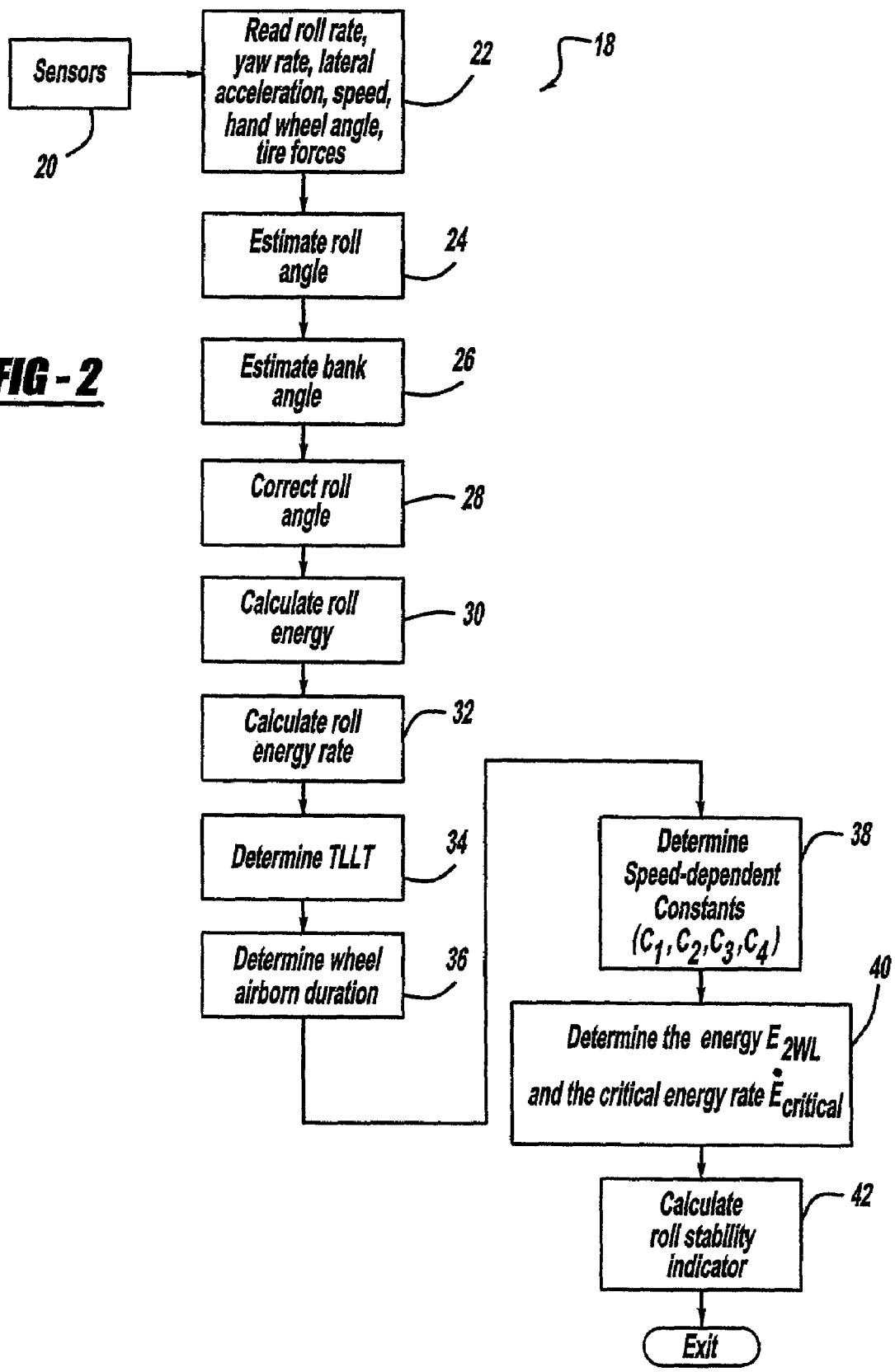
FIG. 2 is a flow chart diagram showing a process for determining a roll stability indicator based on roll energy of the vehicle, roll energy rate of the vehicle, front and rear tire lateral load transfer and wheel airborne duration, according to an embodiment of the present invention.

FIG. 2 is a flow chart diagram 18 showing a method for determining the roll stability indicator (RSI) from equation (16) based on the vehicle rollover energy E from equation (11), the energy roll rate $\dot{E}$ from equation (12), the TLLT value from equations (13) and (14) and the airborne duration $D_{airborne}$, according to one embodiment of the invention. The algorithm reads a plurality of sensor measurements, such as the vehicle roll rate, the vehicle yaw rate, the vehicle lateral acceleration, the vehicle speed, tire/wheel vertical forces and/or the hand-wheel angle from appropriate sensors 20 at box 22. The sensors 20 that provide this information can be any suitable sensors for this purpose, many of which are known, as will be well understood by those skilled in the art.

The algorithm then estimates the roll angle $\phi$ at box 24 and estimates the vehicle bank angle $\theta$ at box 26. Various formulas are known in the art to estimate a vehicle roll angle and a vehicle bank angle using one or more of the sensor measurements referred to above. In one embodiment, a OPS system can be used to determine the estimate of the roll angle $\phi$ and the bank angle $\theta$. One suitable example can be found in U.S. Pat. No. 5,446,658, titled Method and Apparatus for Estimating Incline and Bank Angles of a Road Surface, for this purpose. From the estimated roll angle $\phi$ and the estimated bank angle $\theta$, the algorithm corrects the roll angle $\phi$ at box 28. From the corrected roll angle $\phi$, the algorithm calculates the roll energy E from equation (11) at box 30 and the roll energy rate $\dot{E}$ from equation (12) at box 32.

The algorithm then determines TLLT at box 34 using, for example, tire/wheel sensors and equations (13) and (14). Depending on whether the system includes tire/wheel force sensors or calculates TLLT from estimation algorithms will determine how the algorithm obtains the value TLLT. The algorithm then determines whether any of the wheels are off the ground, and if so, for how long, at box 36.

The algorithm then determines the speed-dependant constants $c_1, c_2, c_3, c_4$ and $c_5$ at box 38 based on the vehicle speed from a desirable look-up table, such as Table 1. The algorithm then determines the energy $E_{2WL}$ and the critical energy rate $\dot{E}_{critical}$ at box 40 for the particular vehicle. The algorithm then calculates the roll stability indicator (RSI) at box 42 using equation (16).

Figure 3:
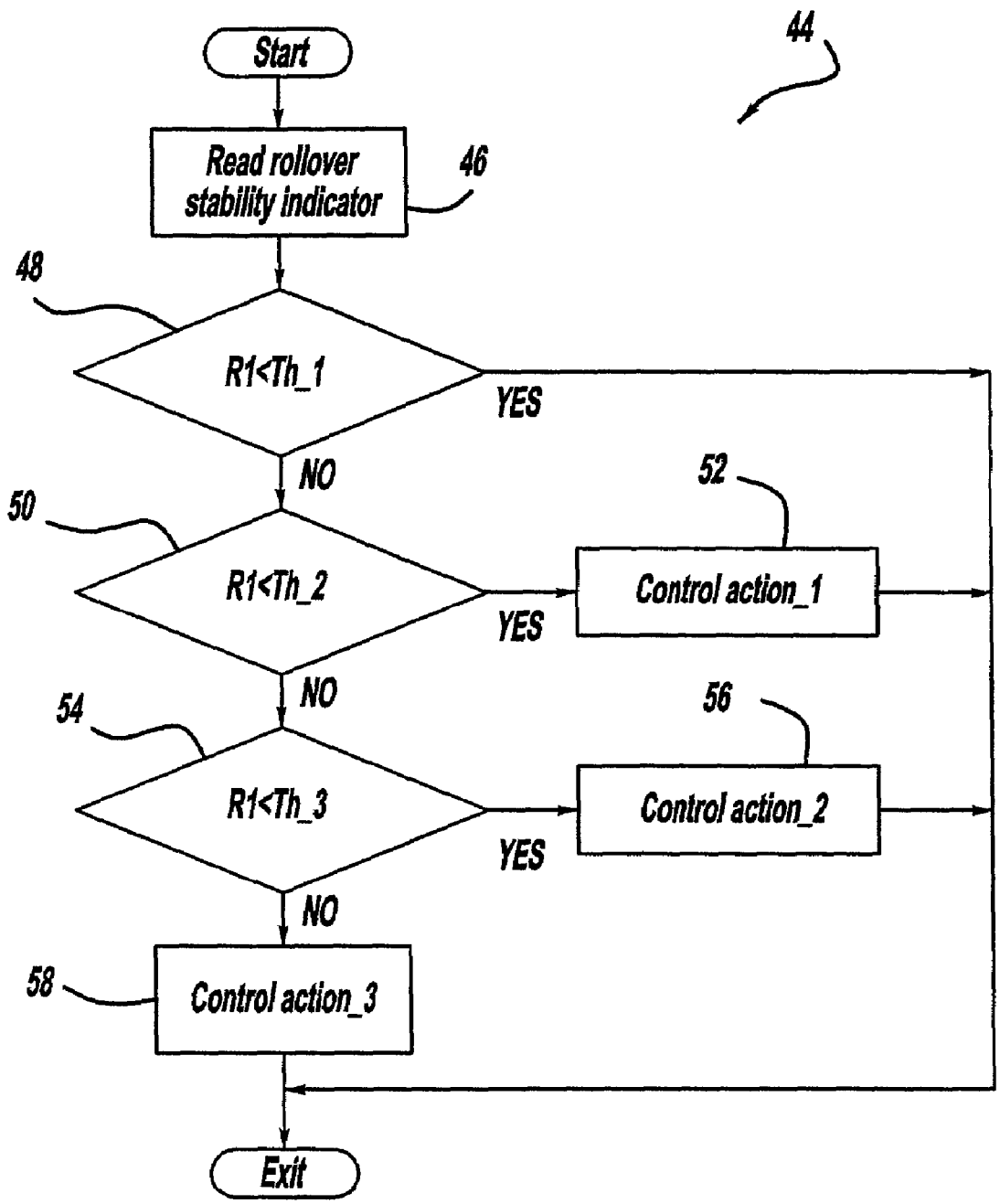
FIG. 3 is a flow chart diagram showing a process for using the roll stability indicator to provide vehicle tip-up and rollover intervention control.

FIG. 3 is a flow chart diagram 44 showing a general overview of an algorithm for a rollover avoidance system that uses the roll stability indicator (RSI) calculated above to take appropriate action to avoid vehicle rollover. The algorithm first reads the roll stability indicator (RSI) at box 46, and then determines whether the roll stability indicator (RSI) is less than a first threshold Th_1 at decision diamond 48. In one embodiment, the threshold value Th_1 provides a first threshold indicating when the vehicle wheels start lifting off the ground for a particular vehicle. If the roll stability indicator (RSI) is less than the first threshold Th_1 at the decision diamond 48, then the vehicle is not in danger of its wheels lifting off of the ground, and the algorithm exits the algorithm.

if the roll stability indicator (RSI) is greater than the first threshold Th_1 at the decision diamond 52, then the algorithm determines whether the roll stability indicator (RSI) is less than a second threshold value Th_2 at decision diamond 50. In one embodiment, the threshold value Th_2 represents the threshold beyond which two vehicle wheels on the same side lift off the ground more than 54 mm. If the roll stability indicator (RSI) is greater than the first threshold value Th_1, but less than the second threshold value Th_2, then the rollover avoidance system takes a first lesser control action at box 52. This first action could include differential braking for one wheel, adjusting the steering wheel angle or stiffening the suspension.

If the roll stability indicator RI is greater than the second threshold value at the decision diamond 52, then the algorithm determines whether the roll stability indicator RI is less than a third threshold value Th_3 at decision diamond 54. If the roll stability indicator RI is greater than the second threshold value Th_2, but less than the third threshold value Th_3, then the stability control takes a second control action at box 56. The second control action can increase the intensity of the control action over the first control action, and possibly provide coordinated control at different control systems.

If the roll stability indicator is greater than the third threshold value Th_3 at the decision diamond 54, then the control algorithm takes a third control action at box 58. The third control action can include emergency braking to slow down the vehicle quickly.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for generating a roll stability indicator for indicating the likelihood that a vehicle will tip-up or rollover, said method comprising:
   providing a roll rate signal of the roll rate of the vehicle;
   providing a yaw rate signal of the yaw rate of the vehicle;
   providing a lateral acceleration signal of the lateral acceleration of the vehicle;
   providing a speed signal of the speed of the vehicle;
   providing a hand-wheel angle signal of the angle of the hand-wheel of the vehicle;
   estimating a roll angle signal of the vehicle based on one or more of the roll rate signal, the yaw rate signal, the lateral acceleration signal, the speed signal and the hand-wheel angle signal;
   estimating a bank angle signal of the vehicle from one or more of the roll rate signal, the yaw rate signal, the lateral acceleration signal, the vehicle speed signal and the hand-wheel angle signal;
   correcting the roll angle signal based on the estimated bank angle signal to provide a corrected roll angle signal;
   calculating a roll energy signal based on the corrected roll angle signal;
   calculating a roll energy rate signal based on the roll energy signal;
   determining a critical energy signal and a critical energy rate signal;
   determining a tire lateral load transfer signal between the loads on tires of the vehicle;
   determining a duration signal of how long one of the vehicle tires has been off the ground; and
   calculating the roll stability indicator based on the roll energy signal, the roll energy rate signal, the critical energy signal, the critical energy rate signal, the tire lateral load transfer signal and the duration signal.

2. The method according to claim 1 wherein calculating the roll stability indicator also includes using speed-dependant constants.

3. The method according to claim 2 wherein the speed-dependent constants are provided in a look-up table for different vehicle speeds.

4. The method according to claim 2 wherein calculating the roll stability indicator includes using the equation:

$$RSI = c_1 \frac{E}{E_{2WL}} + c_2 \frac{\dot{E}}{\dot{E}_{critical}} + c_3 TLLT_{front} + c_4 TLLT_{rear} + c_5 D_{airborne}$$

where RSI is the roll stability indicator, $c_1, c_2, c_3, c_4$ and $c_5$ are the speed-dependant constants, $E_{2WL}$ is the critical energy signal, $\dot{E}_{critical}$ is the critical energy rate signal, E is the roll energy signal, $\dot{E}$ is the roll energy rate signal, TLLT is the tire lateral load transfer signal and $D_{airborne}$ is the duration signal.

5. The method according to claim 1 wherein calculating the roll energy signal includes using the equation:

$$E = T + \Pi = \frac{1}{2} I_1(\varphi)\dot{\varphi}^2 + \Pi_{susp}(\varphi) + MgZ(\varphi)$$

where E is the roll energy signal, T is the kinetic energy of the vehicle, $\Pi$ is the potential energy of the vehicle, $I_1$ is the roll moment of inertia, M is the mass of the vehicle, $\varphi$ is the roll angle, $\Pi_{susp}$ is the potential energy of a suspension of the vehicle during the roll motion, g is the gravitational constant and Z is the movement of the vehicle center of gravity in a vertical direction.

6. The method according to claim 1 wherein calculating the roll energy rate signal includes using the equation:

$$\dot{E} = \dot{\varphi}Q$$

where $\dot{E}$ is the roll energy rate signal, $\dot{\varphi}$ is the derivative of the roll angle signal and Q is a generalized force on the vehicle.

7. The method according to claim 1 wherein determining the critical energy signal and the critical energy rate signal includes determining the critical energy signal and the critical energy rate signal experimentally by vehicle testing.

8. The method according to claim 1 wherein estimating a roll angle signal and estimating a bank angle signal includes using a GPS signal.

9. The method according to claim 1 wherein determining the tire lateral load transfer signal includes using tire/wheel vertical force sensors.

10. A method for generating a roll stability indicator for indicating the likelihood that a vehicle will tip-up or roll over, said method comprising:
   providing vehicle kinematics signals;
   estimating a roll angle signal of the vehicle from the vehicle kinematics signals;
   calculating a roll energy signal based on the estimated roll angle signal;
   calculating a roll energy rate signal based on the roll energy signal;
   determining a tire lateral load transfer signal between the loads on tires of the vehicle;
   determining a duration signal of how long one of the vehicle tires has been off the ground; and
   calculating the roll stability indicator using the roll energy signal, the roll energy rate signal, the tire lateral load transfer signal and the duration signal.

11. The method according to claim 10 further comprising determining a critical energy signal and a critical energy rate signal, wherein calculating the roll stability indicator includes also using the critical energy signal and the critical energy rate signal.

12. The method according to claim 11 wherein determining the critical energy signal and the critical energy rate signal includes determining the critical energy signal and the critical energy rate signal experimentally by vehicle testing.

13. The method according to claim 11 wherein calculating the roll stability indicator also includes using speed-dependent constants.

14. The method according to claim 13 wherein the speed-dependent constants are provided in a look-up table for different vehicle speeds.

15. The method according to claim 13 wherein calculating the roll stability indicator includes using the equation:

$$RSI = c_1 \frac{E}{E_{2WL}} + c_2 \frac{\dot{E}}{\dot{E}_{critical}} + c_3 TLLT_{front} + c_4 TLLT_{rear} + c_5 D_{airborne}$$

where RSI is the roll stability indicator, $c_1, c_2, c_3, c_4$ and $c_5$ are the speed-dependant constants, $E_{2WL}$ is the critical energy signal, $\dot{E}_{critical}$ is the critical energy rate signal, E is the roll energy signal, $\dot{E}$ is the roll energy rate signal, TLLT is the tire lateral load transfer signal and $D_{airborne}$ is the duration signal.

16. The method according to claim 10 wherein providing vehicle kinematics signals includes providing vehicle kinematic signals from one or more of a roll rate sensor, a yaw rate sensor, a lateral acceleration sensor, a vehicle speed sensor, a vehicle hand-wheel angle sensor and tire force sensors.

17. A system for generating a roll stability indicator that indicates the likelihood that a vehicle will tip-up or roll over, said system comprising:
   a plurality of vehicle sensors for providing vehicle kinematics information;
   means for estimating a roll angle signal of the vehicle from the vehicle kinematics information;
   means for calculating a roll energy signal based on the estimated roll angle signal;
   means for calculating a roll energy rate signal based on the roll energy signal;
   means for determining a tire lateral load transfer signal;
   means for determining a wheel airborne duration signal; and
   means for calculating the roll stability indicator using the roll energy signal, the roll energy rate signal, the tire lateral load transfer signal and wheel airborne duration signal.

18. The system according to claim 17 further comprising means for determining a critical energy signal and a critical energy rate signal, wherein the means for calculating the roll stability indicator uses the critical energy signal and the critical energy rate signal.

19. The system according to claim 18 wherein the means for determining the critical energy signal and the critical energy rate signal includes means for determining the critical energy signal and the critical energy rate signal experimentally by vehicle testing.

20. The system according to claim 18 wherein the means for calculating the roll stability indicator uses speed-dependent constants.

21. The system according to claim 20 wherein the speed-dependent constants are provided in a look-up table for different vehicle speeds.

22. The system according to claim 20 wherein the means for calculating the roll stability indicator uses the equation:

$$RSI = c_1 \frac{E}{E_{2WL}} + c_2 \frac{\dot{E}}{\dot{E}_{critical}} + c_3 TLLT_{front} + c_4 TLLT_{rear} + c_5 D_{airborne}$$

where RSI is the roll stability indicator, $c_1, c_2, c_3, c_4$ and $c_5$ are the speed-dependant constants, $E_{2WL}$ is the critical energy signal, $\dot{E}_{critical}$ is the critical energy rate signal, E is the roll energy signal, $\dot{E}$ is the roll energy rate signal, TLLT is the tire lateral load transfer signal and $D_{airborne}$ is the duration signal.

23. The system according to claim 17 wherein the means for calculating a roll energy signal uses the equation:

$$E = T + \Pi = \frac{1}{2} I_1(\varphi)\dot{\varphi}^2 + \Pi_{susp}(\varphi) + MgZ(\varphi)$$

where E is the roll energy signal, T is the kinetic energy of the vehicle, $\Pi$ is the potential energy of the vehicle, $I_r$ is the roll moment of inertia, M is the mass of the vehicle, $\varphi$ is the roll angle, $\Pi_{susp}$ is the potential energy of a suspension of the vehicle during the roll motion, g is the gravitational constant and Z is the movement of the vehicle center of gravity in a vertical direction.

24. The system according to claim 17 wherein the means for calculating the roll energy rate signal uses the equation:

$$\dot{E} = \dot{\varphi}Q$$

where $\dot{E}$ is the roll energy rate signal, $\dot{\varphi}$ is the derivative of the roll angle signal and Q is a generalized force on the vehicle.

25. The system according to claim 17 wherein the means for estimating a roll angle signal includes using a GPS signal.

26. The system according to claim 17 wherein providing vehicle kinematics signals includes providing vehicle kinematic signals from one or more of a roll rate sensor, a yaw rate sensor, a lateral acceleration sensor, a vehicle speed sensor, a vehicle hand-wheel angle sensor and tire/wheel force sensors.

* * * * *